MATERIALS FOR AND METHOD OF BONDING
Filed Nov. 15, 1961
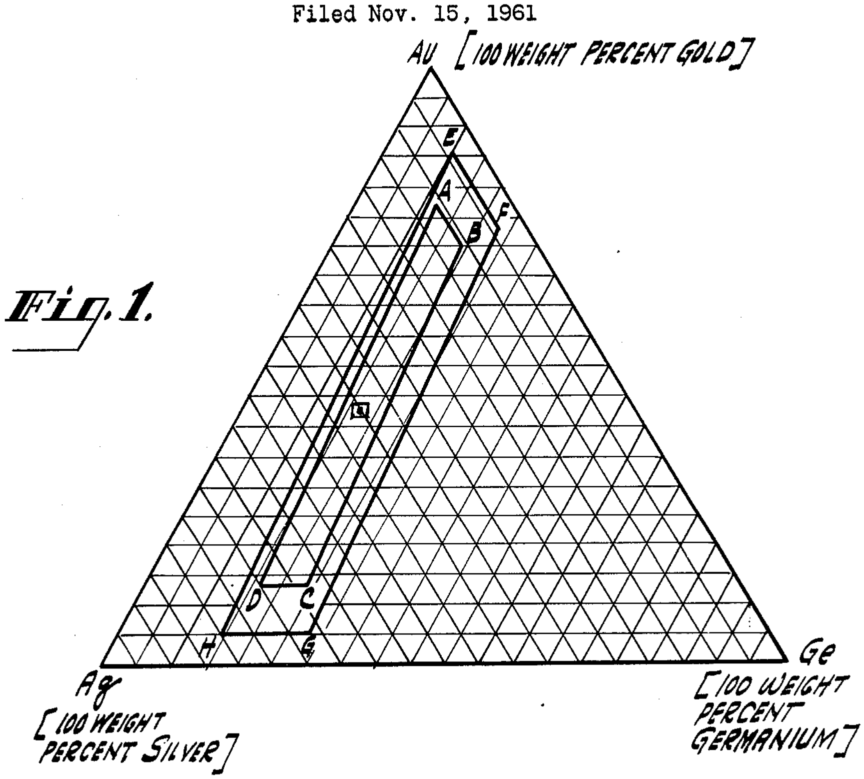
Fig. 2a.
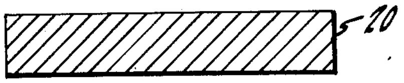
Fig. 2b.
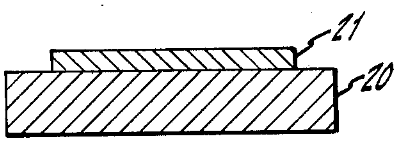
Fig. 2c.
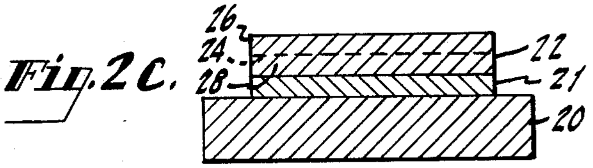
Fig. 2d.
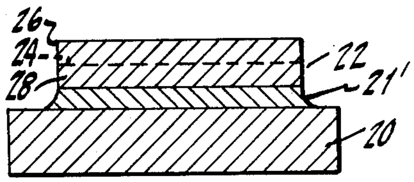
INVENTOR.
PHILIP KUZNETZOFF
BY
W. S. Hill
AGENT 3,140,536
Patented July 14, 1964

3,140,536

MATERIALS FOR AND METHOD OF BONDING

Philip Kuznetzoff, Somerville, N.J., assignor to Radio Corporation of America, a corporation of Delaware Filed Nov. 15, 1961, Ser. No. 152,389
12 Claims. (Cl. 29—473.1)

This invention relates to improved materials for and methods of bonding metallic articles and crystalline semiconductive articles.

In many applications, such as the casing of semiconductor devices, it is desirable to bond a crystalline semiconductive body to a metallic body. The term "metallic" is used hereinafter and in the appended claims as generic to both single metals and alloys of more than one metal. The bond thus formed should be sufficiently rugged to withstand adverse environmental conditions such as high temperature, high humidity and high accelerations.

One method of bonding crystalline semiconductive articles to metallic articles consists of metallizing the semiconductive article to produce a metallic film on the surface thereof, and then brazing the aforesaid metallized surface of the semiconductive article to a metallic article, or to another metallized semiconductive article. The brazing step is generally performed in a vacuum or other nonoxidizing ambient. The brazing material, also known as a high temperature solder, should preferably be a material with a low vapor pressure. Brazes with a relatively high vapor pressure are unsatisfactory, since, at the relatively high temperatures and low pressures required for such brazing, they vaporize sufficiently to form undesirable deposits or films on the semiconductive parts, thus resulting in leakage paths on the semiconductive portions of the brazing assemblage.

In the casing of semiconductor devices, it is desirable to utilize as brazes compositions which will not alter the conductivity type of the semiconductive body of the device. The contact between the metallic body and the semiconductive body should preferably be ohmic in character.

It is also desirable that the bond between the semiconductive body and the metallic body should be free from cracks. It has been found particularly difficult to accomplish this when the semiconductive body consists of III–V compounds such as gallium arsenide and the like.

Accordingly, a general object of the invention is to provide an improved method of bonding metallic articles to semiconductive articles.

Another object of the invention is to provide an improved brazing composition.

Still another object is to provide an improved method of bonding metallic surfaces and metallized surfaces together.

Yet another object is to provide an improved method of bonding III–V compound bodies to metallic bodies.

But another object is to provide an improved method of making ohmic contacts to III–V compound bodies.

The foregoing and further objects of the invention are accomplished by providing a braze consisting essentially of a ternary alloy of germanium, gold and silver. The brazing step is preferably performed in a non-oxidizing ambient such as hydrogen, argon, helium or in a vacuum (a low ambient pressure of about .001 to 0.1 micron Hg). In order to make the contact to III–V compound bodies more ohmic in character, the braze composition may be improved by adding about 0.5 to 2 weight percent (based on the total weight of germanium, gold and silver present) of a metal selected from the group consisting of palladium, cadmium and zinc. Palladium is added when an improved ohmic contact to N-type III–V compound bodies is desired. while zinc or cadmium is added to insure an improved ohmic contact to P-type III–V compound bodies.

The invention and its features will be explained in greater detail by the following examples, when read in conjunction with the accompanying drawing, in which:

FIGURE 1 is a triaxial diagram showing the composition of the germanium-gold-silver brazes according to the invention; and FIGURES 2A–2D are cross-sectional elevational views illustrating successive steps in the bonding of a semiconductive body to a metallic body in accordance with the invention.

Referring to FIGURE 1 of the drawing the points within the triangular diagram represent all the possible alloys, in terms of weight percent of each constituent, of the three components germanium, gold and silver. The brazes of the invention are those compositions corresponding to points within the area of the quadrilateral EFGH. The point E corresponds to 10 weight percent germanium, 86 weight percent gold, and 4 weight percent silver; the point F corresponds to 23 weight percent germanium, 73 weight percent gold, and 4 weight percent silver; the point G corresponds to 28 weight percent germanium, 5 weight percent gold and 67 weight percent silver; the point H corresponds to 15 weight percent germanium, 5 weight percent gold and 80 weight percent silver. The range of useful compositions in accordance with the invention may thus be expressed as 10 to 28 weight percent germanium, 5 to 86 weight percent gold, and 4 to 80 weight percent silver. The meliting point of the compositions within the area of quadrilateral EFGH is approximately in the range from about 375° C. to 630° C.

Although all the compositions in the above range are useful, the preferred brazes are those having a composition corresponding to points within that area of the diagram which is within the smaller quadrilateral ABCD. The point A corresponds to 12 weight percent germanium, 77 weight percent gold and 11 weight percent silver; the point B corresponds to 19 weight percent germanium, 70 weight percent gold and 11 weight percent silver; the point C corresponds to 24 weight percent germanium, 13 weight percent gold and 63 weight percent silver; the point D corresponds to 17 weight percent germanium, 13 weight percent gold, and 70 weight percent silver. The range of preferred compositions may thus be expressed as 12 to 24 weight percent germanium, 13 to 77 weight percent gold, and 11 to 70 weight percent silver. The melting point of the compositions within the area of the quadrilateral ABCD is approximately in the range of about 400° C. to about 600° C.

The brazes of the invention may be utilized to bond one metallic body to another metallic body; to bond a metallic body to a semiconductive body; and to bond a metallic body to a non-metallic body (such as an insulator) which has a metallized surface. Methods of bonding semiconductive bodies to metallic bodies in accordance with the invention are described in the following examples.

*Example I*

In this example, the metallic body 20 (FIGURE 2*a*) may consist of pure metals such as molybdenum, tungsten, tantalum, copper, nickel, and the like, or of alloys such as steel, stainless steel, nickel-iron alloys such as Nichrome, and iron-cobalt-nickel alloys such ac Kovar, Fernico and the like. If desired, the metallic body 20 may be provided with a thin plating of a metal such as nickel which improves the ability of the braze to wet the metallic body. The exact size and shape of metallic body 20 is not critical. In this example, body 20 consists of molybdenum, is coated with a nickel plating (not shown) about 0.1 mil thick, and is in the form of a disk about 200 mils in diameter and about 10 mils thick.

Referring now to FIGURE 2*b*, a preform 21 consisting of one of the germanium-gold-silver brazes according to the invention is placed on one major face of metallic disk 20. In this example, the composition of preform 21 is 17.1 weight percent germanium, 37.9 weight percent gold, and 45 weight percent silver. This composition corresponds to the point within the small square inside the triangular diagram of FIGURE 1, and has a melting point of about 585° C. The exact size and shape of preform 21 is not critical. In this example, preform 21 is in the form of a disk about 125 mils in diameter and about 2 mils thick.

A semiconductive body or pellet 22 is positioned on the braze preform 21, as illustrated in FIGURE 2*c*. In this example, the pellet 22 consists of one of the crystalline III-V semiconductive compounds, that is, one of the phosphides, arsenides and antimonides of aluminum, gallium and indium. The exact size and shape of pellet 22, and the number of P-N junctions therein, is not critical. In this example, pellet 22 consists of gallium arsenide, is in the form of a disk about 125 mils in diameter and about 10 mils thick, and contains a single P-N junction 24 between a P-type portion 26 and an N-type portion 28 of the pellet or die 22. The N-type portion 28 of pellet 22 is the portion in contact with preform 21 in this example.

The assemblage of the metallic body or base 20, the braze preform 21, and the semiconductive pellet 22 is now heated to a temperature above the melting point of preform 21 but below the melting points of metallic base 20 and semiconductive die 22. The heating step is preferably performed in a non-oxidizing ambient, such as hydrogen, nitrogen, forming gas, argon, helium, and the like. The heating step may also be performed in a vacuum, that is, in an ambient pressure of about .001 to 1 micron Hg. In this example, the assemblage is heated in an atmosphere of forming gas (a mixture of 1 volume hydrogen and 9 volumes nitrogen) to a temperature of about 680° C., and maintained at this temperature for about one minute. The braze preform 21 melts and wets both the semiconductive pellet 22 and the metallic base 20. The assemblage is then cooled to room temperature. The molten preform 21 solidifies during the cooling step to form a fillet 21', as illustrated in FIGURE 2*d*, which bonds the semiconductive pellet or die 22 to the metallic base 20. Since germanium acts as a donor in III–V semiconductive compounds and region 28 of the semiconductive pellet 22 is N-type, the contact between the germanium-containing braze 21' and the N-type zone 28 of pellet 22 is ohmic in character.

*Example II*

In this example, metallic body 20 consists of an iron-cobalt-nickel alloy such as Kovar, Fernico, and the like, while the semiconductive body 22 consists of gallium arsenide as in the previous example. The braze preform 21 comprises one of the germanium-gold-silver alloys whose composition corresponds to one of the points within the quadrilateral EFGH in FIGURE 1. In addition to the germanium, gold and silver, the braze of this embodiment contains from about ½ to 2 weight percent of palladium based on the total weight of germanium, gold and silver. The specific alloy of this example contains about 2 parts by weight palladium for 100 total parts by weight of germanium, gold and silver. The melting points of the various brazing compositions corresponding to points within the quadrilateral EFGH is not changed much by the small amounts of additives utilized. The heating step in this example is performed in a hydrogen atmosphere. The palladium present in the preform of this embodiment does not alter or affect the conductivity type of the gallium arsenide pellet, but serves to improve the wetting of the metallic body 20 and of the semiconductive wafer, and thus improves the ohmic quality of the bond between the metallic body 20 and the semiconductive die or pellet 22.

*Example III*

In this example, the metallic body 20 is a nickel-iron alloy such as nichrome, while in the semiconductive pellet or die 22 the conductivity type of zones 26 and 28 have been reversed, so that zone 28 is P-type in this example, while zone 26 is N-type. The braze preform 21 comprises one of the preferred germanium-gold-silver alloys whose composition corresponds to one of the points within the quadrilateral ABCD in FIGURE 1. The composition may for example be 17.1 weight percent germanium, 37.9 weight percent gold, and 45 weight percent silver, as in the previous example. The braze preform of this embodiment contains from about ½ to 2 weight percent (based on the total weight of the germanium, gold and silver present) of an additive selected from the group consisting of zinc and cadmium.

The specific brazing alloy of this example contains about ½ part by weight cadmium for 100 total parts by weight of germanium, gold and silver. The heating step in this example is performed in an atmosphere of argon. Cadmium is an acceptor in III-V compounds and the amount of cadmium present in the brazing preform of this example is sufficient to compensate for the donor action of the germanium present in the alloy, and make the alloy P-type. Since in this example zone 28 of pellet 22 is also P-type, the contact between metallic base 20 and semi-conductive pellet 22 is ohmic in character.

*Example IV*

In this example, the metallic body or base 20 consists of nickel, while the semiconductive die 22 contains a P-type region or zone 28 in contact with the brazing preform 21, as in Example III above. The preform 21 comprises one of the germanium-gold-silver alloys whose composition corresponds to one of the points within the quadrilateral EFGH in FIGURE 1. This range of compositions includes the preferred compositions corresponding to points within quadrilaterial ABCD, and the specific composition of Example II. The specific brazing alloy of this example contains about 2 parts by weight zinc for 100 total parts by weight of germanium, gold and silver. The heating step in this example is performed in a vacuum or residual atmospheric pressure of about .001–1 micron Hg. Zinc is an acceptor in III–V compounds, and the amount of zinc present in the brazing preform 21 of this example is sufficient to compensate for the donor action of the germanium present in the alloy, and make the alloy P-type. Since in this example zone 28 of pellet 22 is P-type, the contact between metallic base 20 and the semiconductive pellet 22 is ohmic in character.

The invention may be practiced in a similar manner for the purpose of bonding two metallic articles together.

An insulating article such as glass, Photoceram, Pyroceram, Ceramicon, quartz, sapphire, or ceramics such as steatite, forsterite, high alumina compositions, and the like may be similarly bonded to a metallic article provided that the surface of the insulating article which is to be bonded is first metallized. Various methods of metallizing insulating articles by depositing a coating of tungsten or molybdenum thereon are known to the art, and any convenient technique may be utilized for this purpose.

There have thus been described improved brazing compositions and improved methods of bonding metallic articles to metallic articles, metallic articles to semiconductive articles, and metallic articles to insulating articles. The above examples have been by way of illustration only and not limitation, since various modifications and variations may be made without departing from the spirit and scope of the invention.

What is claimed is:

1. A ternary alloy consisting essentially of 10 to 28 weight percent germanium, 5 to 86 weight percent gold, and 4 to 80 weight percent silver.

2. A ternary alloy consisting essentially of 10 to 28 weight percent germanium, 5 to 86 weight percent gold, 4 to 80 weight percent silver, and about 0.5 to 2.0 weight percent of an additive selected from the group consisting of palladium, cadmium, and zinc, the weight of additive being based on the total weight of germanium and gold and silver present.

3. A braze consisting essentially of 12 to 24 weight percent germanium, 13 to 77 weight percent gold, and 11 to 70 weight percent silver.

4. A braze consisting essentially of 12 to 24 weight percent germanium, 13 to 77 weight percent gold, 11 to 70 weight percent silver, and about 0.5 to 2.0 weight percent of an additive selected from the group consisting of palladium, cadmium and zinc the weight of additive being based on the total weight of germanium and gold and silver present.

5. A braze consisting essentially of 17.1 weight percent germanium, 37.9 weight percent gold, and 45.0 weight percent silver.

6. A braze consisting essentially of 17.1 parts by weight germanium, 37.9 parts by weight gold, 45.0 parts by weight silver, and about 0.5 to 2 parts by weight of an additive selected from the group consisting of palladium, cadmium and zinc, the weight of the additive being based on the total weight of germanium and gold and silver present.

7. The method of bonding articles composed of a material selected from the group consisting of metals and crystalline semiconductors and metallized insulators, comprising brazing said articles with an alloy consisting essentially of 10 to 28 weight percent germanium, 5 to 86 weight percent gold, and 4 to 80 weight percent silver.

8. The method of bonding articles composed of a material selected from the group consisting of metals and crystalline semiconductors and metallized insulators, comprising brazing said articles with an alloy consisting essentially of 10 to 28 weight percent germanium, 5 to 86 weight percent gold, 4 to 80 weight percent silver, and about 0.5 to 2.0 weight percent of an additive selected from the group consisting of palladium, cadmium, and zinc, the weight of additive being based on the total weight of germanium and gold and silver present.

9. The method of bonding articles composed of a material selected from the group consisting of metals and crystalline semiconductors and metallized insulators, comprising brazing said articles with an alloy consisting essentially of 12 to 24 weight percent germanium, 13 to 77 weight percent gold, and 11 to 70 weight percent silver.

10. The method of bonding articles composed of a material selected from the group consisting of metals and crystalline semiconductors and metallized insulators, comprising brazing said articles with an alloy consisting essentially of 12 to 24 weight percent germanium, 13 to 77 weight percent gold, 11 to 70 weight percent silver, and about 0.5 to 2.0 weight percent of an additive selected from the group consisting of palladium, cadmium, and zinc, the weight of additive being based on the total weight of germanium and gold and silver present.

11. The method of bonding articles composed of a material selected from the group consisting of metals and crystalline semiconductors and metallized insulators, comprising brazing said articles with an alloy consisting essentially of 17.1 weight percent germanium, 37.9 weight percent gold, and 45.0 weight percent silver.

12. The method of bonding articles composed of a material selected from the group consisting of metals and crystalline semiconductors and metallized insulators, comprising brazing said articles with an alloy consisting essentially of 17.1 parts by weight germanium, 37.9 parts by weight gold, 45.0 parts by weight silver, and 0.5 to 2 parts by weight of an additive selected from the group consisting of palladium, cadmium and zinc, the weight of the additive being based on the total weight of germanium and gold and silver present.

References Cited in the file of this patent

UNITED STATES PATENTS 2,763,822 Frola et al. ------------ Sept. 18, 1956